(12) United States Patent
Song et al.

(10) Patent No.: US 9,622,149 B2
(45) Date of Patent: Apr. 11, 2017

(54) METHOD AND DEVICE FOR SELECTING AND MANAGING MOBILITY PROTOCOL IN MOBILE COMMUNICATIONS SYSTEM

(75) Inventors: Jae-Seung Song, Gyeonggi-Do (KR); Hyun-Sook Kim, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 519 days.

(21) Appl. No.: 12/517,909

(22) PCT Filed: Jun. 18, 2008

(86) PCT No.: PCT/KR2008/003433
§ 371 (c)(1),
(2), (4) Date: Jun. 5, 2009

(87) PCT Pub. No.: WO2009/020284
PCT Pub. Date: Feb. 12, 2009

(65) Prior Publication Data
US 2010/0293284 A1    Nov. 18, 2010

Related U.S. Application Data

(60) Provisional application No. 60/954,956, filed on Aug. 9, 2007.

(30) Foreign Application Priority Data

May 26, 2008    (KR) .................. 10-2008-0048857

(51) Int. Cl.
*G06F 15/16*    (2006.01)
*H04W 48/08*    (2009.01)
(Continued)

(52) U.S. Cl.
CPC .......... *H04W 48/08* (2013.01); *H04W 76/022* (2013.01); *H04W 80/045* (2013.01)

(58) Field of Classification Search
CPC .. H04W 48/08; H04W 80/045; H04W 76/022
(Continued)

(56) References Cited

U.S. PATENT DOCUMENTS 8,538,430 B1 *   9/2013   Filiatrault et al. ............ 455/436
2003/0097484 A1 *   5/2003   Bahl ............................. 709/313
(Continued)

FOREIGN PATENT DOCUMENTS

| WO | WO01/41470 A2 | 6/2001 |
| WO | WO-2007/080549 A1 | 7/2007 |

OTHER PUBLICATIONS

U.S. Appl. No. 60/946,162, filed Jun. 2007, Shaheen, Kamel M.*
(Continued)

*Primary Examiner* — Thuong Nguyen
(74) *Attorney, Agent, or Firm* — Birch, Stewart, Kolasch & Birch, LLP

(57) ABSTRACT

Disclosed is a method for selecting and managing a mobility protocol between a network and a terminal in a mobile communication system. When the terminal is to setup an IP tunnel for data transmission/reception with the network supporting a plurality of mobility protocols, firstly, the terminal is configured to transmit a list of terminal-supported mobility protocols and/or its preference information (e.g., information about mobility protocol preferred by the terminal) to the network, and secondly, the network is configured to determine (select) a mobility protocol of an IP tunnel for data transmission/reception with the terminal based on the information, thereby enhancing an efficiency of the resource when the IP tunnel is setup between the terminal and the network.

8 Claims, 4 Drawing Sheets

(51) Int. Cl.
*H04W 76/02* (2009.01)
*H04W 80/04* (2009.01)

(58) Field of Classification Search
USPC ......... 709/238, 228, 245; 726/3, 7; 370/331, 370/356
See application file for complete search history.

(56) References Cited

U.S. PATENT DOCUMENTS

| | | | |
|---|---|---|---|
| 2003/0120811 A1 | 6/2003 | Hanson et al. | |
| 2005/0243840 A1* | 11/2005 | Sivalingam et al. | 370/401 |
| 2005/0283832 A1* | 12/2005 | Pragada et al. | 726/12 |
| 2006/0075073 A1* | 4/2006 | Bichot | 709/220 |
| 2006/0262778 A1* | 11/2006 | Haumont et al. | 370/356 |
| 2007/0189219 A1* | 8/2007 | Navali et al. | 370/331 |
| 2007/0201469 A1* | 8/2007 | Iyer et al. | 370/391 |
| 2007/0223409 A1* | 9/2007 | Herrero | 370/310 |
| 2007/0248054 A1* | 10/2007 | Chen et al. | 370/331 |
| 2007/0250642 A1* | 10/2007 | Thubert et al. | 709/245 |
| 2007/0283149 A1* | 12/2007 | Devarapalli | 713/168 |
| 2008/0025263 A1* | 1/2008 | Pelkonen | 370/332 |
| 2008/0101376 A1* | 5/2008 | Do et al. | 370/395.21 |
| 2008/0102837 A1* | 5/2008 | Li et al. | 455/436 |
| 2008/0175201 A1* | 7/2008 | Ahmavaara et al. | 370/331 |
| 2008/0181178 A1* | 7/2008 | Shaheen | 370/331 |
| 2008/0205357 A1* | 8/2008 | Pandey et al. | 370/338 |
| 2008/0259869 A1* | 10/2008 | Wang et al. | 370/331 |
| 2008/0285497 A1* | 11/2008 | Pichna et al. | 370/312 |
| 2008/0320149 A1* | 12/2008 | Faccin | 709/228 |
| 2009/0016300 A1* | 1/2009 | Ahmavaara et al. | 370/331 |
| 2009/0017826 A1* | 1/2009 | Shaheen | 455/442 |
| 2009/0037595 A1* | 2/2009 | Breau et al. | 709/230 |
| 2009/0047947 A1* | 2/2009 | Giaretta et al. | 455/432.1 |
| 2009/0132817 A1* | 5/2009 | Zhao | 713/168 |
| 2010/0185849 A1* | 7/2010 | Rune et al. | 713/156 |
| 2010/0246533 A1* | 9/2010 | Lundin et al. | 370/332 |
| 2010/0290621 A1* | 11/2010 | Muhanna et al. | 380/270 |

OTHER PUBLICATIONS

Shaheen_60946162.*
3GPP: 3rd Generation Partnership Project; Technical Specification Group Services and System Aspects; Architecture Enhancements for non-3GPP accesses (Release 8): vol. TSG SA, (May 30, 2007) XP050209107, p. 20, paragraph 7, p. 25, paragraph 12.
D. Damic, D. Premec, B. Patil, M. Sahasrabudhe, Nokia Siemens Networks; Proxy Mobile IPv6 indication and discovery draft-damic-netlmm-pmip6-ind-discover-01.txt; (Jun. 19, 2007), XP015050854, p. 8, paragraph 5, p. 9, paragraph 6-p. 11, paragraph 7.
Huawei: "Mobility Mode Selection" 3GPP Draft; S2-071694 Mobility Mode Selection, 3rd Generation Partnership Project (3GPP), vol. SA WG2, No. (Apr. 18, 2007), XP050259461, p. 1, paragraph 4-p. 4, paragraph, figures 1-3.
NORTE: SAE GW Selection and Mobility mode selection:, 3GPP Draft; S2-071505 SAE GW Selection Rev of 1178 V2, 3rd Generation Partnership Project (3GPP), Mobile Competence Centre; vol. SA WG2, No. Warsaw; Apr. 2, 2007, XP050258670, pp. 1-6.

* cited by examiner

METHOD AND DEVICE FOR SELECTING AND MANAGING MOBILITY PROTOCOL IN MOBILE COMMUNICATIONS SYSTEM

This application is the National Phase of PCT/KR2008/003433 filed on Jun. 18, 2008, which claims priority under 35 U.S.C. 119(e) to U.S. Provisional Application No. 60/954,956 filed on Aug. 9, 2007 and under 35 U.S.C. 119(a) to Patent Application No. 10-2008-0048857 filed in Korea on May 26, 2008, all of which are hereby expressly incorporated by reference into the present application.

BACKGROUND OF THE INVENTION

1. Field of the Invention

The present invention relates to a mobile communication system, and in particular, to selecting and managing a mobility protocol between a network and a terminal in a mobile communication system.

2. Description of the Background Art

In order to meet a variety of forums and new technologies related to the 4th generation mobile communications, the 3rd Generation Partnership Project (3GPP) which aims to provide technical specifications of the 3rd generation mobile communications system has proceeded with research for the Long Term Evolution/System Architecture Evolution (LTE/SAE) technologies since year-end 2004 as a part of efforts to optimize and enhance performances of the 3GPP technologies. The SAE mainly led by the 3GPP SA WG2 relates to research of network technologies which aims to determine a network structure together with the LTE work of the 3GPP TSG RAN and to support mobility between networks of different versions. Recently, the SAE has been considered one of the essential standardization issues of the 3GPP. Such work is to develop the 3GPP to be a system based on the IP and supporting a variety of radio (wireless) connection technologies, and has progressed with the aim of an optimized packet-based system capable of minimizing a transmission delay with enhanced data transmission capability.

The SAE upper level reference model defined by the 3GPP SA WG2 may include a non-roaming case and roaming cases with a variety of scenarios. Detailed descriptions thereof are given in 3GPP TS 23.401 and TS 23.402. FIG. 1 is a schematic view of such network structure.

One of the distinctive characteristics of the network structure shown in FIG. 1 is that it is based on a 2 tier model having an eNode B of the Evolved UTRAN and a gateway of the core network. The eNode B has a similar function, although not exactly the same, to the eNode B and RNC of the existing UMTS system, and the gateway has a function similar to the SGSN/GGSN of the existing system. Another distinctive characteristic is that different interfaces are exchanged by the control plane and the user plane between the access system and the core network. While an Iu interface exists between the RNC and SGSN in the existing UMTS system, two separate interfaces, i.e., S1-MME and S1-U, are used in the Evolved Packet Core (SAE) system since the Mobility Management Entity (MME) which handles the processing of a control signal is structured to be separated from the gateway (GW).

Next, there are two types of gateways: a Serving Gateway (SG) and a Packet Data Network (PDN) gateway. In general, the serving gateway (SG) may serve as an anchor point for handling mobility management within the 3GPP network, and the PDN gateway may serve as an anchor point for handling mobility management of the 3GPP network and the non-3GPP network. These two gateways, however, may also be implemented with a Single Gateway Configuration Option.

As mentioned above, as the specifications for the non-3GPP interworking are formed, different protocols of the IETF have been introduced, in addition to the GTP protocol that has been traditionally used in the existing 3GPP. In particular, IETF protocols, such as the Proxy Mobile IPv6 (PMIPv6), the Dual Stack Mobile IPv6 (DSMIPv6), etc., have been introduced in its draft version prior to the Request for Comments (RFC) of the IETF, and used as an essential protocol for the non-3GPP interworking in the current SAE specifications. Basically, the GTP protocol is used for 3GPP Inter Radio Access Technology (Inter-RAT) handover, and the IETF-based protocols are used for S2 interfaces for the non-3GPP interworking. In particular, a reference point which provides a user plane tunneling and a tunnel management between the serving gateway and the PDN gateway, a reference point which is used with a reference point S5 in roaming, and a reference point S8 can be used in both the GTP and the IETF-based protocols. The table 1 shows available protocol options for several important reference points in the SAE structure (architecture) as below.

TABLE 1

| Reference Points | Section | Protocol |
| --- | --- | --- |
| S1-U | E-UTRAN ← → Serving GW | GTP-U |
| S3 | SGSN ← → MME | GTP |
| S4 | SGSN ← → Serving Gateway | GTP |
| S5 | Serving Gateway ← → PDN Gateway | GTP, PMIP |
| S8 | Inter PLMN variant of S5 (roaming) | GTP, PMIP |
| S2a | Trusted non 3GPP IP access ← → Gateway | PMIPv6, CMIPv4 FA CoA Mode, DSMIPv6 |
| S2b | ePDG ← → Gateway | PMIPv6 |
| S2c | UE ← → Gateway | DSMIPv6 |

The mobility management in the SAE may be roughly divided into two types. One is mobility between the 3GPP Inter-RAT systems, and the other is mobility between the 3GPP access system and the non-3GPP access system.

With recent trends of the network evolution to be evolved into the $4^{th}$ generation All-IP network, a network structure in which various types of access systems can be connected to the core network is foreseen. However, such various types of access systems may utilize different interfaces (reference points) when they are connected to the network. In addition, options for using different mobility protocols are required within each interface (reference point). If such conditions or options do not exist, a possibility of failure in IP tunnel setup between the terminal and the network would increase. In addition, unnecessary interaction between the terminal and the network occurs greatly, thus to cause the waste of network resources in a wired/wireless interface.

SUMMARY OF THE INVENTION

Therefore, an object of the present invention is to provide a method for exchanging, by a network and a terminal, information about mobility management protocols (or mobility protocols) that can be respectively supported by the network and the terminal, determining (selecting) and managing a mobility protocol for data path (i.e., IP tunnel) setup based on the information, and a device for implementing such method.

To achieve this and other advantages and in accordance with the purpose of the present invention, as embodied and broadly described herein, there is provided a method for managing a protocol in a mobile communication system, including:

(A) receiving, by a network node, information about a mobility protocol from a terminal;

(B) determining, by the network node, a mobility protocol for an IP tunnel setup based on the received information about the mobility protocol; and (C) notifying, by the network node, the determined mobility protocol to the terminal.

Preferably, the method further includes (D) setting, by the network node, an IP tunnel, to which the determined mobility protocol is applied, with the terminal.

Preferably, the step (D) further includes the steps of transmitting, by the network node, a message to initiate an IP tunnel setup to the terminal; and setting, by the network node, the IP tunnel with the terminal.

Preferably, the step (B) includes the steps of comparing, by the network node, information about the mobility protocol received from the terminal with information about mobility protocol in which the network node can support; and determining, by the network node, a mobility protocol of the IP tunnel to setup with the terminal based on the comparison result.

To achieve this and other advantages and in accordance with the purpose of the present invention, as embodied and broadly described herein, there is provided a method for managing a protocol in a mobile communication system, including:

receiving, by a first network node (e.g., a PDN gateway), information about a mobility protocol from a terminal;

determining, the first network node, a mobility protocol for an IP tunnel setup based on the received information about the mobility protocol;

notifying, by the first network node, the determined mobility protocol to a network node serving as a second network node (e.g., a Mobile Access Gateway (MAG) or a Foreign Agent (FA)); and setting, by the first network node, an IP tunnel with the second network node.

To achieve this and other advantages and in accordance with the purpose of the present invention, as embodied and broadly described herein, there is provided a terminal, including:

a transmitter/receiver configured to transmit information about a network-supported mobility protocol for IP tunnel setup, and to receive a notification message of the mobility protocol determined by the network; and a processor configured to generate information about the mobility protocol, and to transmit the generated information to the network.

To achieve this and other advantages and in accordance with the purpose of the present invention, as embodied and broadly described herein, there is provided an entity (or a device) in a mobile communication system, including:

a module configured to process information about a mobility protocol received from a terminal, to determine a mobility protocol for an IP tunnel setup based on the received information about the mobility protocol and information supported by the network, and to initiate the IP tunnel setup by using the determined mobility protocol.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, description will now be given in detail of the embodiments of the present invention, examples of which are illustrated in the accompanying drawings.

The present invention is applied to the 3GPP mobile communication system. However, without being limited to this, it may also be applied to the next generation mobile communication and other wired/wireless communications to which the technical scope of the present invention is applied.

Hereinafter, terms used or to be used in the description of the present invention will be generally defined.

The terminal according to the present invention may include all types of devices which can perform the technical features of the present invention. That is, the terminal according to the present invention comprehensively includes all devices capable of performing a function of setting up an IP tunnel with the network and of transmitting/receiving data to/from the network node via the set IP tunnel. Examples of such terminals include mobile communication terminals (e.g., User Equipments (UEs), mobile phones, portable phones, Digital Multimedia Broadcasting (DMB) phones, gaming phones, camera-equipped phones, smart phones, and the like), notebook computers, desktop computers, Personal Digital Assistants (PDAs), other home appliances, and the like.

Figure 1:
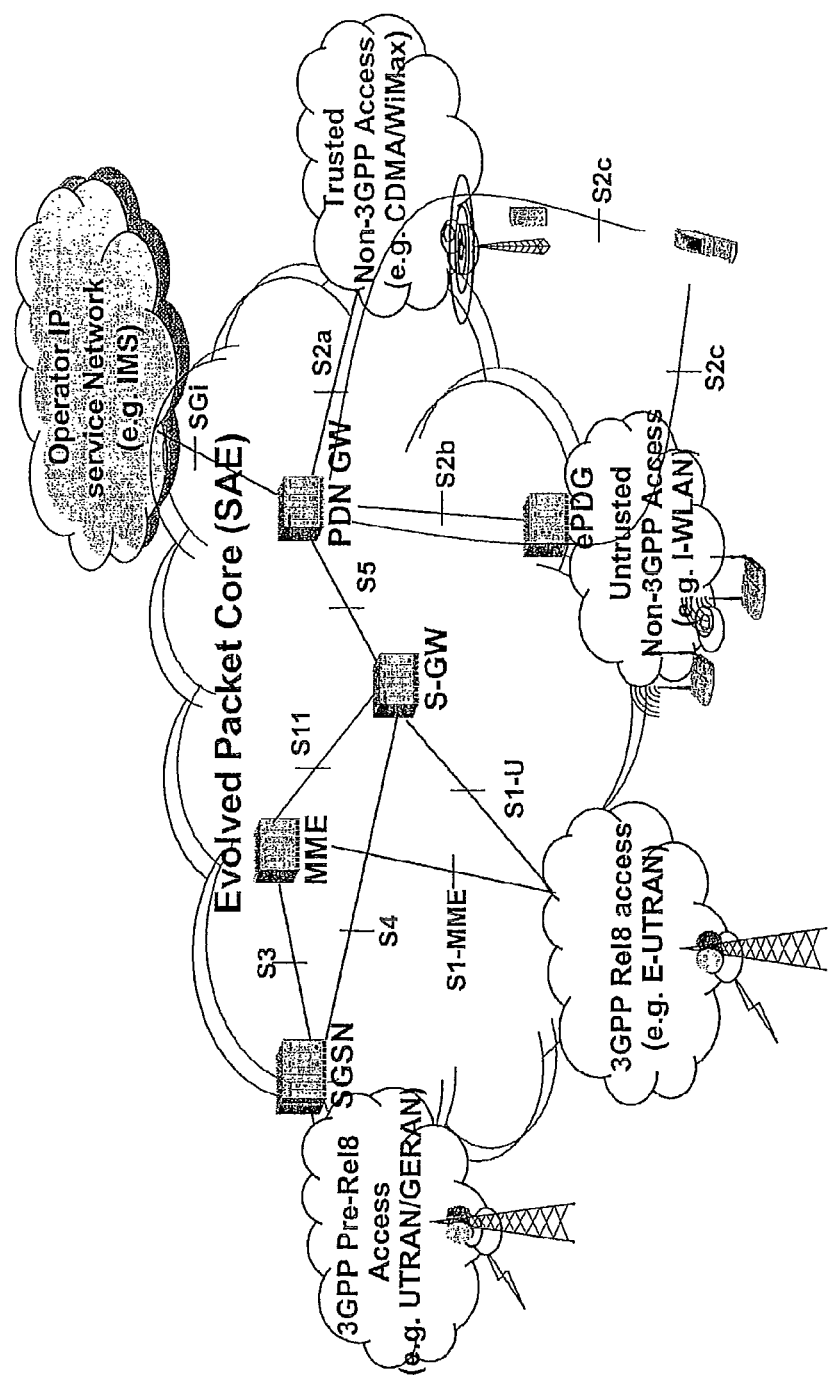
FIG. 1 illustrates a reference model of the 3GPP network.

The access system generally denotes a network through which the terminal is connected to the core network for communications (e.g., voice communication, data communication, video communication, etc.). Examples of such access system in FIG. 1 may include the UTRAN/GERAN or E-UTRAN as the 3GPP access system, or I-WLAN or CDMA/WiMax as the non-3GPP access system.

The Internet Protocol (IP) tunnel refers to, when communication between entities (e.g., the terminal and the network node) is established (set), a data path of the communication.

The mobility protocol denotes a protocol used for mobility management of the terminal and data transmission by connecting the terminal to the core network. According to the type of the access system and characteristics thereof, there may be various types of the mobility protocol used between the terminal and the network.

The attach denotes connecting the terminal to the network node, and more comprehensively, performing a handover.

The present invention conceptually relates to, when the terminal is to setup an IP tunnel for data transmission/reception with the network supporting a plurality of mobility protocols, firstly, the terminal configured to transmit a list of the terminal-supported mobility protocols and/or its preference information to the network, and secondly, the network configured to determine (select) a mobility protocol of an IP tunnel to transmit/receive data with the terminal based on the information, thereby enhancing an efficiency of the resources when the IP tunnel setup between the terminal and the network.

In order to implement the preferred embodiments of the present invention, the terminal and the network (or network node) according to the present invention may perform the following functions and operations:

First, functions and operations of the terminal according to the present invention are as follows: 1) it may include software (or a module including software) and a user interface which allow a user to determine (select) an access system and a preferred protocol (hereinafter, referred to as 'preference' information) using a manual, and a user interface. Meanwhile, the preference information may exist not only by requiring the user to manually input, but also by being pre-stored within the terminal by default; (Here, the preferred protocol refers to a protocol preferred by the terminal when it is to connect to the access system.) 2) the terminal according to the present invention defines a message to be used when the preference designated by the manual is forwarded to the gateway of the network; 3) the terminal defines a message to exchange capability of the terminal-supported mobility protocol with the network; and 4) the terminal defines a message to request a mobility protocol change from the network.

Second, functions and operations of the network according to the present invention are as follows: 1) the network (or network operator) includes a mechanism to process and provide terminal preference (i.e., information about the preferred protocol in which the terminal desires to use for connection); 2) the network according to the present invention defines a message to exchange capability of the gateway-supported mobility protocol with the terminal; 3) the network includes a module capable of determining a mobility protocol based on a variety of information (e.g., terminal preference information, operator policy, etc.); 4) the network includes a module capable of determining a mobility protocol change by a request of the terminal (or terminal user) based on the types of mobility tunnels that are currently setup; and 5) the network defines a message to use when the network requests the mobility protocol change from the terminal.

When a mobility protocol is selected between the terminal and the network or when a mobility protocol of the terminal is provided, refers to a time point of performing attach, handover, or roaming, for instance.

Figure 2:
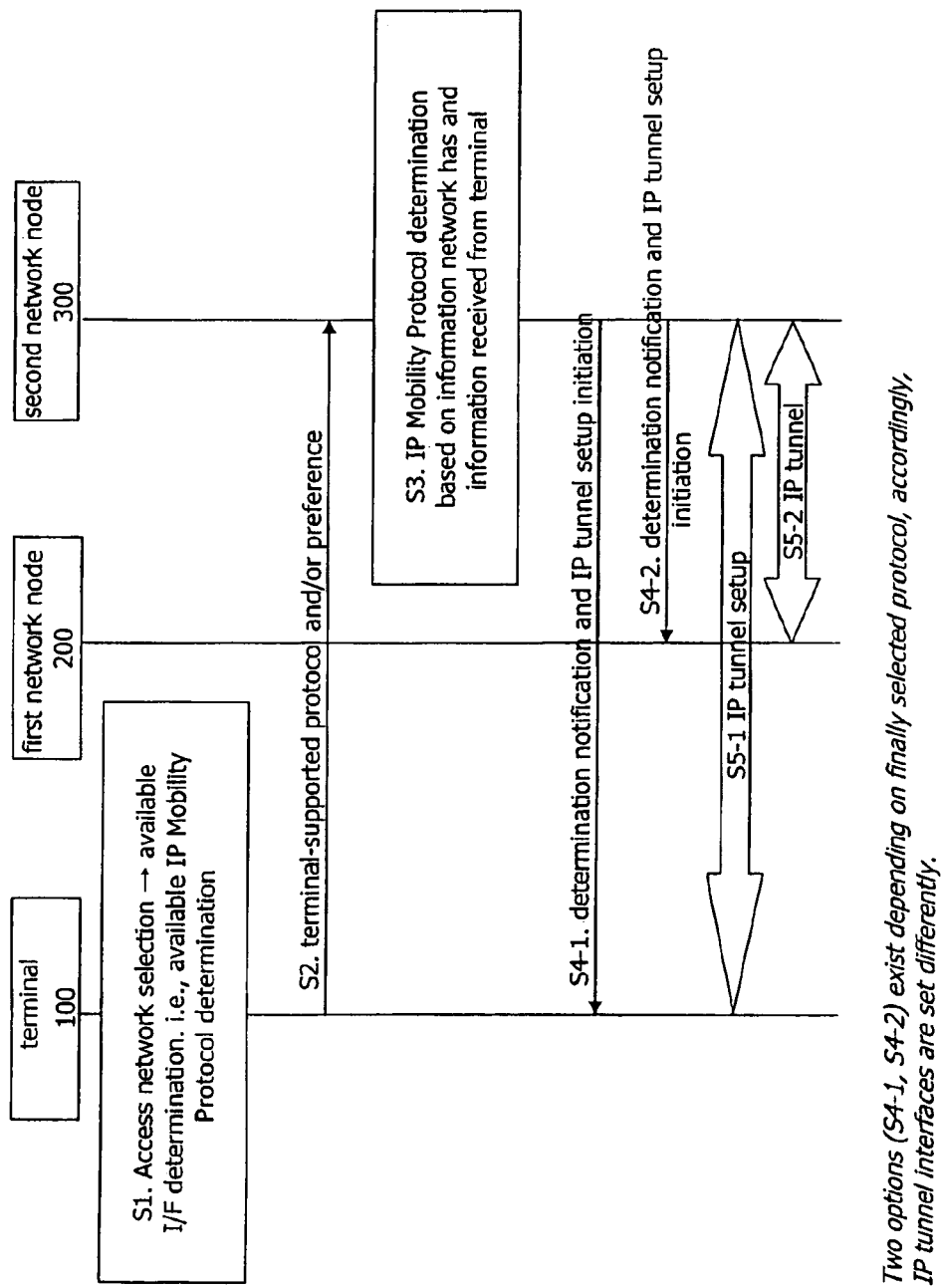
FIG. 2 is a signal flowchart showing a method for selecting and managing a mobility protocol between a network and a terminal according to a first embodiment of the present invention.

FIG. 2 is a signal flowchart showing a method for selecting and managing a mobility protocol between a network and a terminal according to a first embodiment of the present invention. Exemplary embodiments in FIG. 2 include two examples: first, an IP tunnel is setup (established) between a terminal 100 and a second network node 300, and second, an IP tunnel is setup between a first network node 200 and the second network node 300. In an example of the network entity shown in FIG. 1, the first network node 200 may refer to a network node serving as an intermediate node on the network, such as Mobile Access Gateway (MAG) or Foreign Agent (FA). The second network node 300 may be the Packet Data Network (PDN) gateway.

Hereinafter, description of the embodiments of the present invention will be given in detail with reference to FIG. 2.

The terminal 100 selects an access system to attempt communications (e.g., voice communication, video communication, and the like) (S1). Here, if the terminal 100 selects an access system, an available interface is determined according to the selected access system. That is, a mobility protocol which enables the terminal 100 to communicate with the access system is determined.

If the terminal 100 selects the second network node 300, the terminal 100 exchanges information about its supported mobility protocols while communicating with the second network node 300. This is because an interface may have options for several mobility protocols. Accordingly, the terminal 100 transmits to the second network node 300 information related to its supported mobility protocols (S2). For instance, the information related to the mobility protocols may include information about terminal-supported mobility protocols, indication information indicating its supported mobility protocols or indication information indicating its supported mobility modes.

In step (S2), while the terminal 100 communicates with the second network node 300, it may additionally transmit information indicating which mobility protocol it prefers to use. Such information is called 'preference' as described above. In addition, in step (S2), the terminal 100 may forward a certain message (e.g., so called 'attach message request message' or 'attach trigger message') to the network (i.e., the second network node) by including its capability (i.e., its supported protocols and/or preferences) therein. Alternatively, the terminal 100 may provide information to the second network node 300 by including its capability in a message for authentication use during an authentication process for attach or by a separate message after the authentication process. Here, the authentication process refers to a process to check whether or not the terminal 100 has been subscribed to a specific service (e.g., a communication service provided by the network) while the terminal 100 exchanges messages for authentication with an Authentication Authorization Accounting (AAA) server (not shown in FIG. 2).

Based on the terminal-supported mobility protocol information and terminal-preferred mobility protocol information (i.e., preference) received from step (S2) as well as protocol information supported by the second network node 300, the second network node 300 may determine (select) the mobility protocol to be used for an IP tunnel (S3). Alternatively, based on the terminal-supported mobility protocol information which is received from step (S2), the second network node 300 may determine (select) the mobility protocol to be used for the IP tunnel. Meanwhile, even though an option to select the mobility protocol for the IP tunnel is on the network side, when the second network node 300 determines the mobility protocol, a priority for selecting the mobility protocol for the IP tunnel may be determined according to an operator's policy.

The second network node 300 notifies the determined mobility protocol, and initiates an IP tunnel setup (S4-1 and S4-2 or S5-1 and S5-2). Meanwhile, according to the mobility protocol determination (selection) of the second network node 300, different interfaces of the IP tunnel would exist. That is, according to the determined mobility protocol, as shown in FIG. 2, the IP tunnel may be setup in two cases (i.e., S4-1 or S4-2).

First, description of step S4-1 will be given. If the second network node 300 selects DSMIPv6 as the mobility protocol, the network notifies the determined mobility protocol (i.e., DSMIPv6) to the terminal 100, and then initiates the IP tunnel setup with the terminal 100 (S4-1). If the second network node 300 selects PMIPv4 or CMIPv4 FA mode as the mobility protocol, the second network node 300 notifies the determined mobility protocol (i.e., PMIPv4 or CMIPv4 FA mode) to the first network node 200 (i.e., intermediate node on the network), and then initiates the IP tunnel setup with the first network node 200 (S4-2). Here, the first network 200 may be a network entity (device) such as MAG or FA.

After the IP tunnel has been setup in step (S4-1 or S4-2), data can be sent/received via the set IP tunnel (S5-1 or S5-2). That is, if the IP tunnel is setup between the second network node 300 and the terminal 100 through step (S4-1), data can be sent/received via the set IP tunnel (S5-1). As shown in step (S4-2), if the IP tunnel is setup between the second network node 300 and the first network node 200, data can be sent/received via the set IP tunnel (S5-2).

Figure 3:
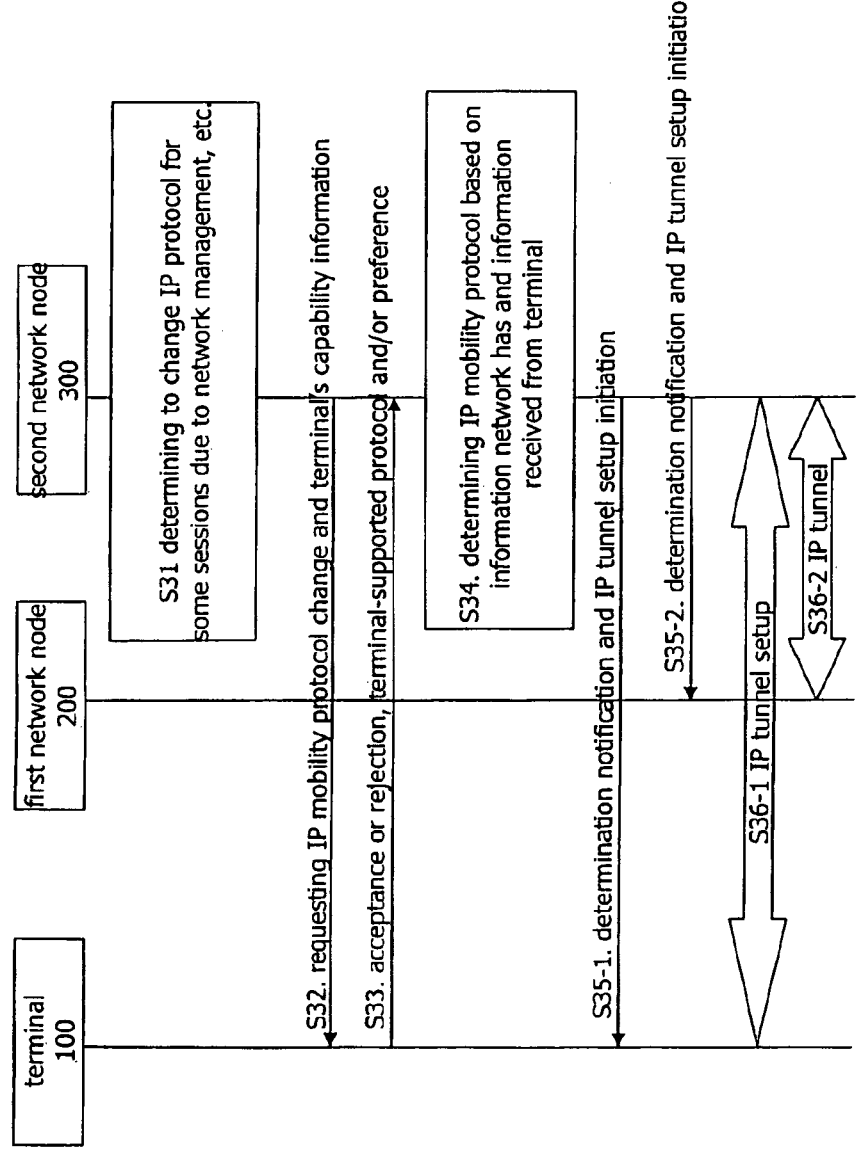
FIG. 3 is a signal flowchart showing the method for selecting and managing a mobility protocol between the network and the terminal according to a second embodiment of the present invention.

FIG. 3 is a signal flowchart showing the method for selecting and managing a mobility protocol between the network and the terminal according to a second embodiment of the present invention. The second embodiment in FIG. 3 relates to a case of changing the mobility protocol of the set IP tunnel after the IP tunnel is setup according to the determined mobility protocol. In particular, the example in FIG. 3 shows a case in which the network side changes the mobility protocol based on its processing condition, operator's policy, and the like. For instance, if there are a plurality of IP tunnels set by a specific mobility protocol (e.g., PMIP), the second network node 300 may request the change of the IP tunnel protocol into another mobility protocol (e.g., CMIP) from the terminal 100 in order to reduce a burden of managing other IP tunnels.

Referring to FIG. 3, the second network node 300 may determine to change a mobility protocol for some sessions due to a reason of network management (e.g., operator rules, traffic, resource management, etc.) (S31). Here, the some sessions, for instance, refer to setting up, by the second network node 300, an IP tunnel using a certain mobility protocol with the terminal 100 or the first network node 200, and sending/receiving data via the set IP tunnel by using the certain mobility protocol.

The second network node 300 requests the terminal 100 to change the mobility protocol of the IP tunnel (S32). Here, the IP tunnel signifies a path for data transmission/reception set (established) between the second network node 300 and the terminal 100. In step (S32), the second network node 300 may additionally request terminal's capability information (e.g., a list of its supported mobility protocol and/or preference) from the terminal 100.

In response to the request in step (S32), the terminal 100 transmits a message of acceptance or rejection for the request of mobility protocol change (S33). Here, the terminal 100 may additionally transmit its supported mobility protocol list and/or preference information.

The second network node 300 determines a mobility protocol by referring to the information sent by the terminal 100 (i.e., the mobility protocol list and/or preference), and then initiates an IP tunnel setup of the determined mobility protocol (S34~S36-2).

The processes after step (S34) in FIG. 3 are the same as those after step (S3) in FIG. 2. Therefore, description of the processes after step (S3) in FIG. 2 may be applied to those after step (S34) in FIG. 3.

Figure 4:
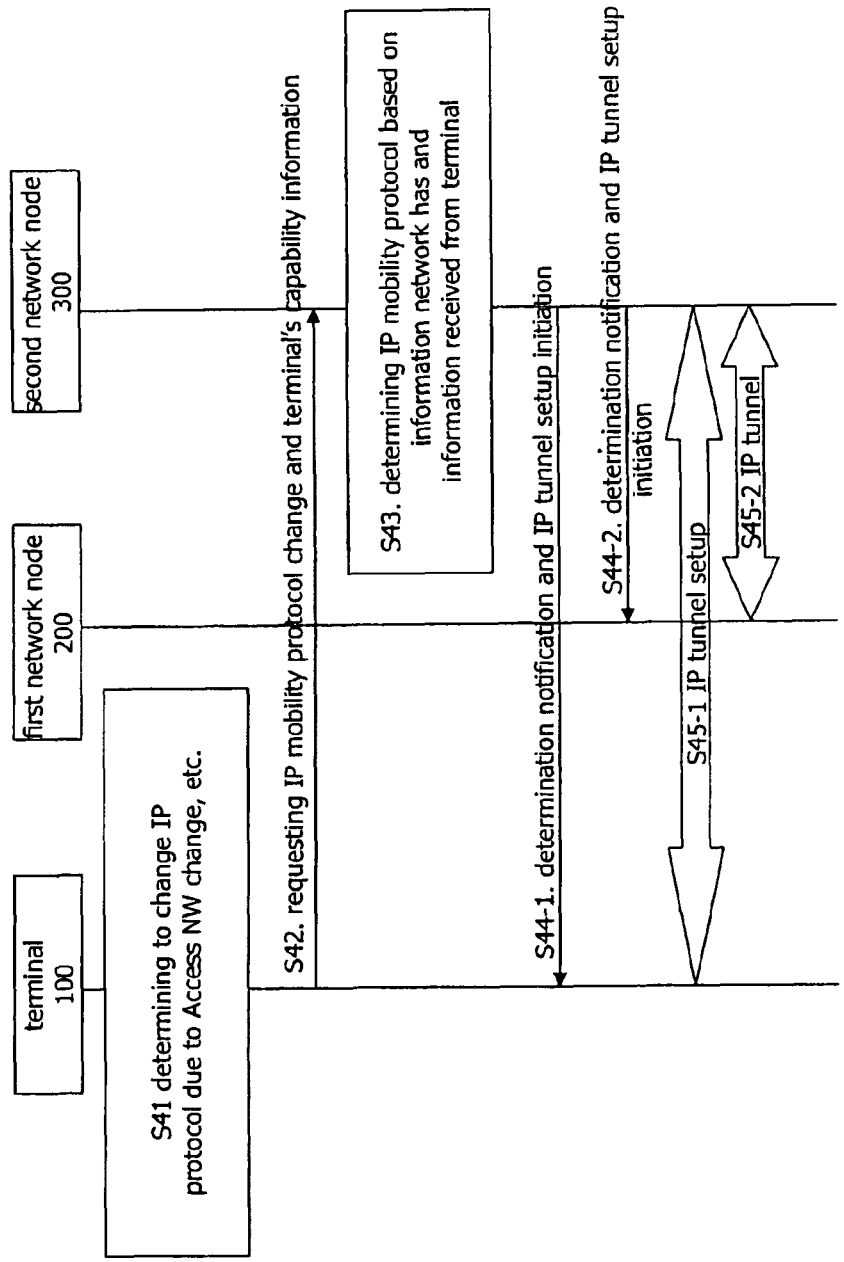
FIG. 4 is a signal flowchart showing the method for selecting and managing a mobility protocol between the network and the terminal according to a third embodiment of the present invention.

FIG. 4 is a signal flowchart showing the method for selecting and managing a mobility protocol between the network and the terminal according to a third embodiment of the present invention. When compared to the second embodiment in FIG. 3, the third embodiment in FIG. 4 relates to a case in which the terminal 100 requests a mobility protocol change of the set IP tunnel after the IP tunnel is setup by the determined mobility protocol. In the example in FIG. 4, the terminal (or terminal user) 100 requests the network to change the currently set IP tunnel of the mobility protocol, for instance, due to reasons of charging, Quality of Service (QoS) or the like.

Referring to FIG. 4, if the terminal 100 desires to setup an IP tunnel with an access service which charges less (more economical) as compared to the network of the currently set IP tunnel (S41), the terminal 100 determines to change the current access system and transmits its supported mobility protocol list and/or preference information to the second network node 300 (S42). Hereinafter, the processes after step (S43) in FIG. 4 are the same as those after step (S34) in FIG. 3. Therefore, description of the processes after step (S43) in FIG. 4 will refer to description of each corresponding portion in FIG. 3.

Hereinafter, construction and capability of the terminal according to the present invention will be described in detail.

The terminal according to the present invention may include software in which the examples in FIGS. 2 through 4 are implemented or a module equipped with such software. Such module, as a component of the terminal, may be referred to as a processor or controller.

The terminal according to the present invention may include hardware and software components, which are essential to implement the technical features of the present invention. For instance, the terminal in the present invention may include a transmitter/receiver (transceiver) configured to transmit supported mobility protocol list and/or preference information to the access system (e.g., the second network node) for the IP tunnel setup and to receive a notification message of the mobility protocol determined by the access system; and a controller configured to generate the supported mobility protocol list and/or preference information, and to transmit the generated information to the access system.

Further, the terminal according to the present invention may include basic hardware and software (or a module including the software) of the terminal, such as a display and a speaker as an output unit; a keypad and a microphone as an input unit; a battery configured to supply power to the terminal; a storage unit (memory) configured to store a list of mobility protocols supported by the terminal. However, detailed description thereof is understood by those skilled in the art, and explanations therefor are omitted.

Hereinafter, construction and capability of the network node according to the present invention will be described in detail.

The network node according to the present invention may include software in which the examples in FIGS. 2 through 4 are implemented or a module equipped with such software. That is, the node according to the present invention may include a module which handles mobility protocol information received from the terminal (i.e., its supported mobility protocol list and preference information). The module is a device for selecting and managing the mobility protocol of the network, and performs a function of determining (selecting) a mobility protocol for the IP tunnel setup based on the mobility protocol information received from the terminal and network-supported mobility protocol information, and of initiating the IP tunnel setup with the determined mobility protocol. In addition, the module notifies to the terminal the determined mobility protocol using a certain message (e.g., a notification message or IP tunnel session initiation message). Meanwhile, the module may be referred to as a controller or processor. Further, the network node may include a transmitter/receiver (transceiver) configured to transmit/receive message and data.

The method according to the present invention may be implemented as software, hardware or any combination thereof. For instance, the method according to the present invention may be implemented as codes or commands within a software program which can be stored in a storage medium (e.g., internal memory within a mobile terminal, flash memory, hard disks, etc.) and executed by a processor (e.g., internal microprocessor within a mobile terminal).

Effect of the Invention

The present invention has an effect of easily selecting a mobility protocol of the IP tunnel on a network side when the terminal is to set up the IP tunnel for data transmission/reception with the network that supports a plurality of mobility protocols, by sending information about terminal-supported mobility protocol list as well as preference information (i.e., information about a mobility protocol preferred by the terminal).

With such effect, from the terminal perspective, the terminal can reduce the failure rate of attach to the network, thereby reducing the battery consumption and power of the terminal. In addition, from the network perspective, the attach mode can be controlled, thereby enhancing an efficiency of the network management and preventing the unnecessary waste of resources.

In addition, the present invention has an effect of enhancing an efficiency of the network management and policy since the mobility protocol of the IP tunnel can be flexibly changed according to the conditions of the network and the terminal.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for managing a protocol by a network node in a mobile communication system, the method comprising:

receiving, by the Network node, from a terminal that supports Third Generation Partnership Project (3GPP) and non-3GPP communications, a message requesting an authentication process for a non-3GPP access network from a 3GPP access network, when the terminal attaches to the non-3GPP access network or hands over into the non-3GPP access network;

wherein the received message includes information that indicates a preferred mobility protocol, Dual Stack Mobile IPv6 (DSMIPv6), consistent with S2 interfaces, supported by the terminal;

selecting, by the Network node, the preferred mobility protocol, Dual Stack Mobile IPv6 (DSMIPv6), for setting up an Internet Protocol (IP) tunnel with the terminal from among candidates based on the received message, an access network capability and a network policy;

notifying, by the Network node, the selected mobility protocol for setting up the IP tunnel to the terminal; and establishing the authentication process for a non-3GPP access network from the 3GPP access network when the terminal attaches to the non-3GPP access network or hands over to the non-3GPP access network after the notification by the network node is performed.

2. The method of claim 1, wherein the IP tunnel to which the selected mobility protocol is applied is set up with the terminal.

3. The method of claim 2, wherein a message to initiate setting up the IP tunnel is transmitted to the terminal, and the IP tunnel is established with the terminal.

4. The method of claim 1, wherein the preferred mobility protocol comprises information about terminal-preferred mobility protocols when the terminal sets up the IP tunnel.

5. The method of claim 1, further comprising:

if the network node determines the selected mobility protocol for setting up the IP tunnel to be the DSMIPv6, providing a local IP address to the terminal.

6. A terminal that supports Third Generation Partnership Project (3GPP) and non-3GPP communications, comprising:

a transmitter configured to transmit, to a network node, a message requesting an authentication process for a non-3GPP access network from a 3GPP access network, when the terminal attaches to the non-3GPP access network or hands over into the non-3GPP access network, wherein the transmitted message includes information that indicates a preferred mobility protocol, Dual Stack Mobile IPv6 (DSMIPv6), consistent with S2 interfaces, supported by the terminal;

a receiver configured to receive a notification message indicating the preferred mobility protocol, Dual Stack Mobile IPv6 (DSMIPv6), selected by the Network node for setting up an Internet Protocol (IP) tunnel for the terminal based on the transmitted message, an access network capability and a network policy; and the transmitter is further configured to transmit a message to establish the authentication process for a non-3GPP access network from the 3GPP access network when the terminal attaches to the non-3GPP access network or hands over to the non-3GPP access network after the notification message is received.

7. The terminal of claim 6, wherein the preferred mobility protocol comprises information about terminal-preferred mobility protocols when the terminal establishes the IP tunnel.

8. A method for managing a protocol in a mobile communications system, the method comprising:

transmitting, by a terminal that supports Third Generation Partnership Project (3GPP) and non-3GPP communications, to a Network node a message requesting an authentication process for a non-3GPP access network from a 3GPP access network, when the terminal attaches to the non-3GPP access network or hands over into the non-3GPP access network, wherein the transmitted message includes information that indicates a preferred mobility protocol; Dual Stack Mobile IPv6 (DSMIPv6), consistent with S2 interfaces, supported by the terminal;

receiving, by the terminal, a notification for indicating the preferred mobility protocol, Dual Stack Mobile IPv6 (DSMIPv6), selected by the Network node to be used to set up an Internet Protocol (IP) tunnel with the Network node based on the transmitted message, an access network capability and a network policy; and transmitting, by a terminal, a message to establish the authentication process for a non-3GPP access network from the 3GPP access network when the terminal attaches to the non-3GPP access network or hands over to the non-3GPP access network after the notification message is received.

\* \* \* \* \*